US008033322B1

(12) United States Patent
Trent

(10) Patent No.: US 8,033,322 B1
(45) Date of Patent: Oct. 11, 2011

(54) SPLIT HEAT RECOVERY SYSTEM

(76) Inventor: Richard W. Trent, Johns Island, SC (US)

( * ) Notice: Subject to any disclaimer, the term of this patent is extended or adjusted under 35 U.S.C. 154(b) by 183 days.

(21) Appl. No.: 12/291,313

(22) Filed: Nov. 7, 2008

(51) Int. Cl.
*F24F 7/007* (2006.01)
(52) U.S. Cl. ......... 165/54; 165/59; 165/66; 165/104.14; 165/274; 165/272; 165/909
(58) Field of Classification Search ............ 165/54, 165/66, 909, 274, 272, 104.14, 59
See application file for complete search history.

(56) References Cited

U.S. PATENT DOCUMENTS

| | | | | |
|---|---|---|---|---|
| 850,784 A | * | 4/1907 | Richmond | 165/54 |
| 3,618,659 A | * | 11/1971 | Rawal | 165/248 |
| 3,788,388 A | * | 1/1974 | Barkmann | 165/54 |
| 4,142,575 A | * | 3/1979 | Glancy | 165/66 |
| 4,476,922 A | * | 10/1984 | Heilig et al. | 165/104.25 |
| 4,517,810 A | * | 5/1985 | Foley et al. | 62/186 |
| 4,761,966 A | * | 8/1988 | Stark | 62/176.6 |
| 4,765,231 A | * | 8/1988 | Aniello | 454/239 |
| 4,841,733 A | * | 6/1989 | Dussault et al. | 62/93 |
| 5,441,103 A | * | 8/1995 | Rezkallah et al. | 165/104.29 |
| 5,913,360 A | * | 6/1999 | Stark | 165/66 |
| 6,578,629 B1 | * | 6/2003 | Trent | 165/274 |
| 6,591,902 B1 | * | 7/2003 | Trent | 165/274 |
| 6,658,874 B1 | * | 12/2003 | Trent | 62/173 |

* cited by examiner

*Primary Examiner* — John Ford

(57) ABSTRACT

A space has inlet and outlet registers and outside and exhaust air ducts. The outside air duct is located adjacent to the inlet register. The exhaust air duct is located adjacent to the outlet register. The space has an outside air passageway through the outside air duct adjacent to the inlet register. The space has an exhaust air passageway through the exhaust air duct adjacent to the outlet register. A thermosyphon run around heat pipe assembly includes outside air coils and exhaust air coils. Vapor lines and liquid lines couple the coils. The outside air coils are positioned adjacent to the air inlet duct. The exhaust air coils are located adjacent to the air outlet duct. A control device, in the form of a modulating return damper, is located between the air ducts. An air filter is provided upstream of and adjacent to the outside air coils.

1 Claim, 3 Drawing Sheets

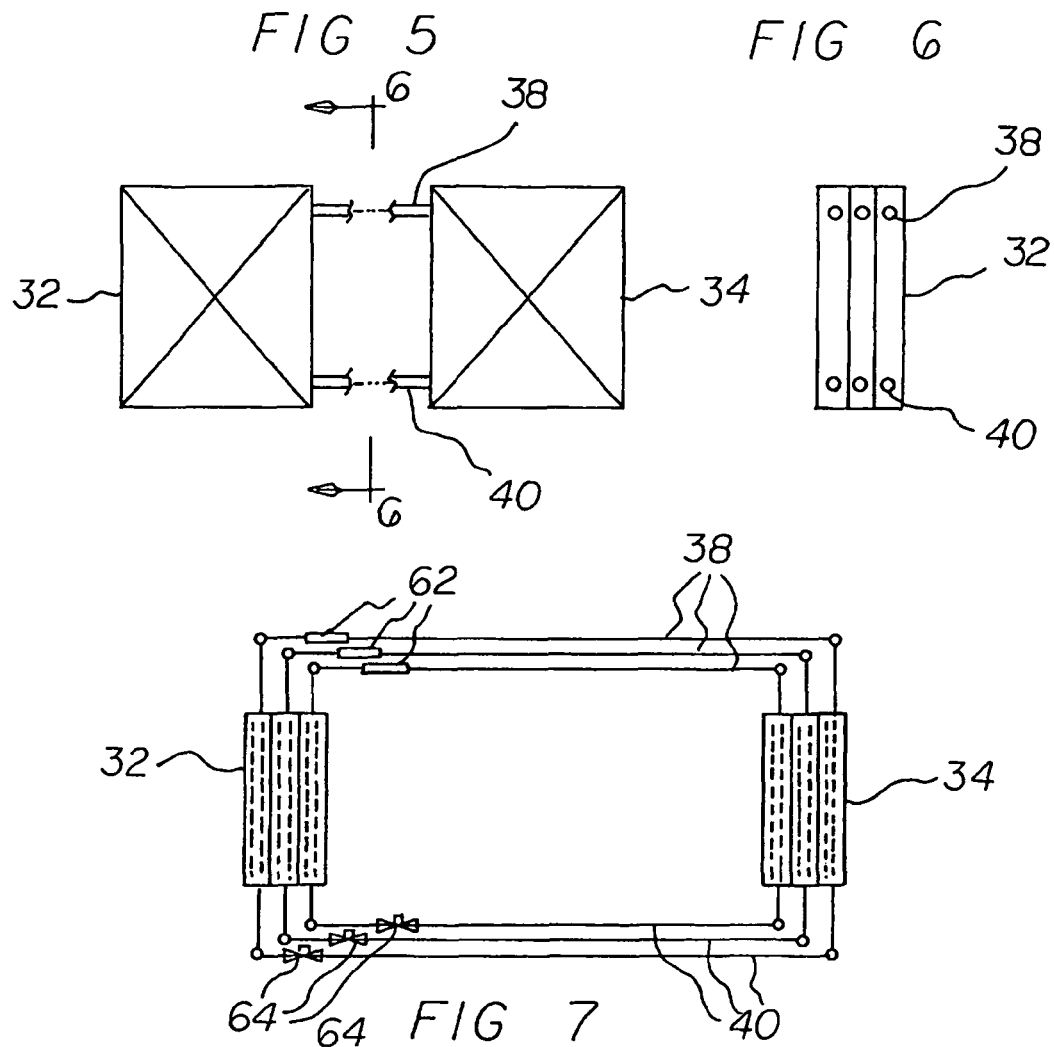
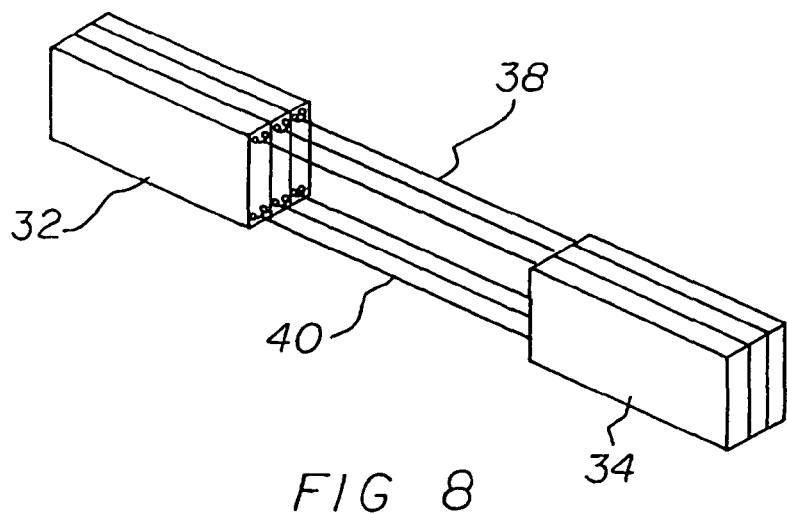

SPLIT HEAT RECOVERY SYSTEM

BACKGROUND OF THE INVENTION

1. Field of the Invention

The present invention relates to a split heat recovery system and more particularly pertains to transferring heat within heating, ventilating and air conditioning systems without conventionally imposing location restrictions, the transferring being done in a safe, ecological, energy efficient and economical manner.

2. Description of the Prior Art

The use of heat transferring systems of known designs and configurations is known in the prior art. More specifically, heat transferring systems of known designs and configurations previously devised and utilized for the purpose of transferring heat through known methods and apparatuses are known to consist basically of familiar, expected, and obvious structural configurations, notwithstanding the myriad of designs encompassed by the crowded prior art which has been developed for the fulfillment of countless objectives and requirements.

By way of example, U.S. Pat. No. 6,658,874 issued Dec. 9, 2003 to Trent relates to an Advanced Energy Efficient Air Conditioning, Dehumidification and Reheat Method and Apparatus. U.S. Pat. No. 6,591,902 issued Jul. 15, 2003 to Trent relates to an Apparatus for Applying Controllable, Multipurpose Heat Pipes to Heating, Ventilation, and Air Conditioning Systems. Lastly, U.S. Pat. No. 6,578,629 issued Jun. 17, 2003 to Trent relates to an Application of Heat Pipe Science to Heating, Refrigeration and Air Conditioning Systems.

While these devices fulfill their respective, particular objectives and requirements, the aforementioned patents do not describe a split heat recovery system that allows for transferring heat within heating, ventilating and air conditioning systems without conventionally imposing location restrictions, the transferring being done in a safe, ecological, energy efficient and economical manner.

In this respect, the split heat recovery system according to the present invention substantially departs from the conventional concepts and designs of the prior art, and in doing so provides an apparatus primarily developed for the purpose of transferring heat within heating, ventilating and air conditioning systems without conventionally imposing location restrictions, the transferring being done in a safe, ecological, energy efficient and economical manner.

Therefore, it can be appreciated that there exists a continuing need for a new and improved split heat recovery system which can be used for transferring heat within heating, ventilating and air conditioning systems without conventionally imposing location restrictions, the transferring being done in a safe, ecological, energy efficient and economical manner. In this regard, the present invention substantially fulfills this need.

SUMMARY OF THE INVENTION

In view of the foregoing disadvantages inherent in the known types of heat transferring systems of known designs and configurations now present in the prior art, the present invention provides an improved split heat recovery system. As such, the general purpose of the present invention, which will be described subsequently in greater detail, is to provide a new and improved split heat recovery system and method which has all the advantages of the prior art and none of the disadvantages.

To attain this, the present invention essentially comprises a split heat recovery system. A room is provided. The room has an inlet register. In this manner outside air is passed into the room. The room has an outlet register. In this manner exhaust air is passed from the room.

An air duct assembly is provided. The air duct assembly includes an outside air duct. The outside air duct has an open first end. The first end is adapted to receive outside air. The outside air duct has a second end. The second end is located adjacent to the inlet register. The air duct assembly includes an exhaust air duct. The exhaust air duct has a first end. The first end is located adjacent to the inlet register. The exhaust air duct has an open second end. The second end is adapted to pass exhaust air to the atmosphere. The second end of the outside air duct is located adjacent to the first end of the exhaust air duct. The air duct assembly has an outside air passageway. The outside air passageway is provided through the outside air duct adjacent to the inlet register. The air duct assembly has an exhaust air passageway. The exhaust air passageway is provided through the exhaust air duct adjacent to the outlet register.

Provided next is a thermosyphon run around heat pipe assembly. The heat pipe assembly includes outside air coils. The heat pipe assembly includes exhaust air coils. The heat pipe assembly also includes vapor lines and liquid lines. The vapor lines and liquid lines couple the outside air coils and the exhaust air coils. The assembly includes a fluid refrigerant. The refrigerant is provided in the air coils and the lines. The refrigerant is adapted to change state and move between the air coils and the lines. In this manner thermal energy is transferred during operation and use.

An entrance chamber is provided. The entrance chamber is provided between the outside air passageway and the inlet register. The outside air coils are positioned within the entrance chamber at a central extent of the outside air passageway. In this manner a first portion of outside air will pass into the entrance chamber then through the outside air coils and then into the inlet duct. Further in this manner a second portion of outside air will pass into the entrance chamber bypassing the outside air coils and then into the inlet duct. A first damper is provided. The first damper is provided in the entrance air passageway in advance of the outside air coils. A second damper is provided. The second damper is provided in the entrance passageway following the outside air coils. The dampers are adapted to control the percent of outside air passing through the outside air coils.

An exit chamber is provided. The exit chamber is provided between the outlet register and the exhaust air passageway. The outside air coils are positioned within the exit chamber at a central extent of the exhaust air passageway. In this manner a first portion of exhaust air will pass into the entrance chamber then through the exhaust air coils and then into the outlet duct. Further in this manner a second portion of exhaust air will pass into the exit chamber bypassing the exhaust air coils and then into the inlet duct. A first damper is provided. The first damper is provided in the exhaust air passageway in advance of the exhaust air coils. A second damper is provided. The second damper is provided in the exit passageway following the exhaust air coils. In this manner the percent of exhaust air passing through the exhaust air coils is controlled. A supplemental damper is provided. The supplemental damper is provided in the form of a modular return damper. The supplemental damper is provided between the inlet and outlet registers.

Further provided are control devices. The control devices are provided in the vapor lines and the liquid lines. The control devices in the vapor lines are small heat exchangers.

In this manner the flow of vapor is controlled. The control devices in the vapor lines are valves. The valves control the flow of liquid.

Provided last is an air filter. The air filter is provided in the entrance chamber upstream of and adjacent to the outside air coils.

There has thus been outlined, rather broadly, the more important features of the invention in order that the detailed description thereof that follows may be better understood and in order that the present contribution to the art may be better appreciated. There are, of course, additional features of the invention that will be described hereinafter and which will form the subject matter of the claims attached.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of descriptions and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

It is therefore an object of the present invention to provide a new and improved split heat recovery system which has all of the advantages of the prior art heat transferring systems of known designs and configurations and none of the disadvantages.

It is another object of the present invention to provide a new and improved split heat recovery system which may be easily and efficiently manufactured and marketed.

It is further object of the present invention to provide a new and improved split heat recovery system which is of durable and reliable constructions.

An even further object of the present invention is to provide a new and improved split heat recovery system which is susceptible of a low cost of manufacture with regard to both materials and labor, and which accordingly is then susceptible of low prices of sale to the consuming public, thereby making such split heat recovery system economically available to the buying public.

Even still another object of the present invention is to provide a split heat recovery system for transferring heat within heating, ventilating and air conditioning systems without conventionally imposing location restrictions, the transferring being done in a safe, ecological, energy efficient and economical manner.

Lastly, it is an object of the present invention to provide a new and improved split heat recovery system. A space has inlet and outlet registers and outside and exhaust air ducts. The outside air duct is located adjacent to the inlet register. The exhaust air duct is located adjacent to the outlet register. The space has an outside air passageway through the outside air duct adjacent to the inlet register. The space has an exhaust air passageway through the exhaust air duct adjacent to the outlet register. A thermosyphon run around heat pipe assembly includes outside air coils and exhaust air coils. Vapor lines and liquid lines couple the coils. The outside air coils are positioned adjacent to the air inlet duct. The exhaust air coils are located adjacent to the air outlet duct. A control device, in the form of a modulating return damper, is located between the air ducts. An air filter is provided upstream of and adjacent to the outside air coils.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 5 is a plan view of the thermosyphon run around heat pipes of the prior Figures.

FIG. 6 is a cross sectional view taken along line 6-6 of FIG. 5.

FIG. 7 is a plan view of the pipes illustrated in the prior Figure but with control devices added.

FIG. 8 is a perspective view of the pipes illustrated in the prior Figure.

The same reference numerals refer to the same parts throughout the various Figures.

DESCRIPTION OF THE PREFERRED EMBODIMENT

Figure 1:
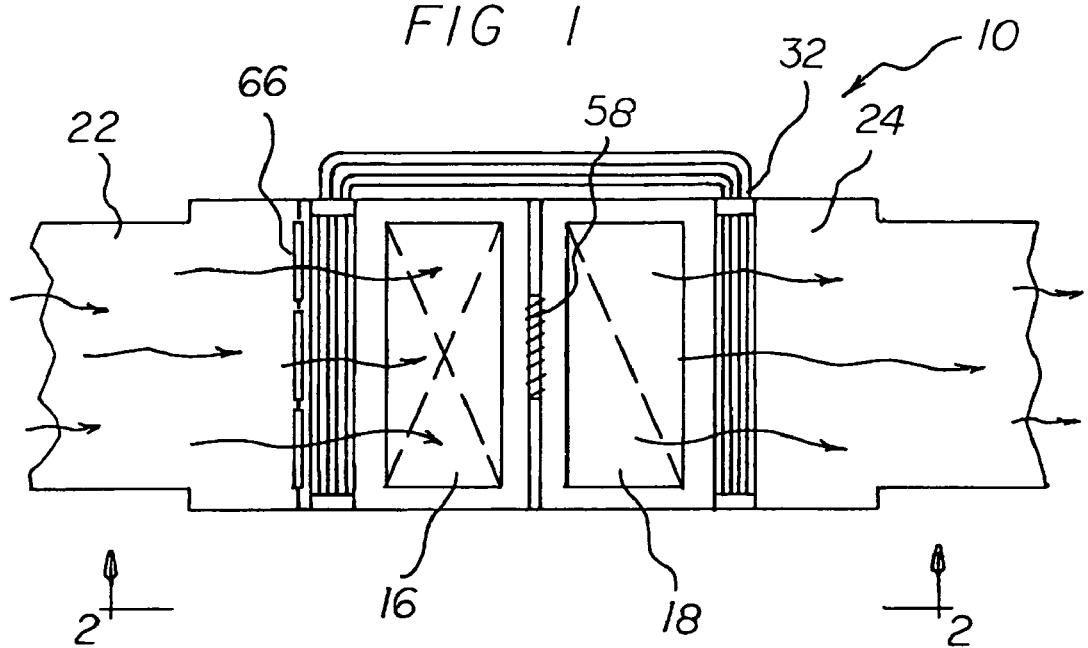
FIG. 1 is a plan view of a split heat recovery thermosyphon run around heat pipe system constructed in accordance with the principles of the present invention.
Figure 2:
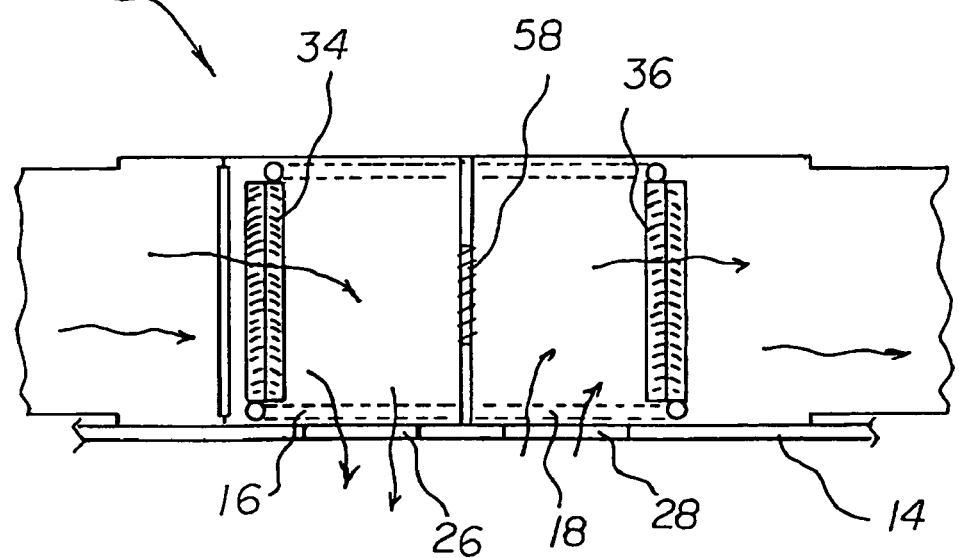
FIG. 2 is a side elevational view of the system take along line 2-2 of FIG. 1.
Figure 3:
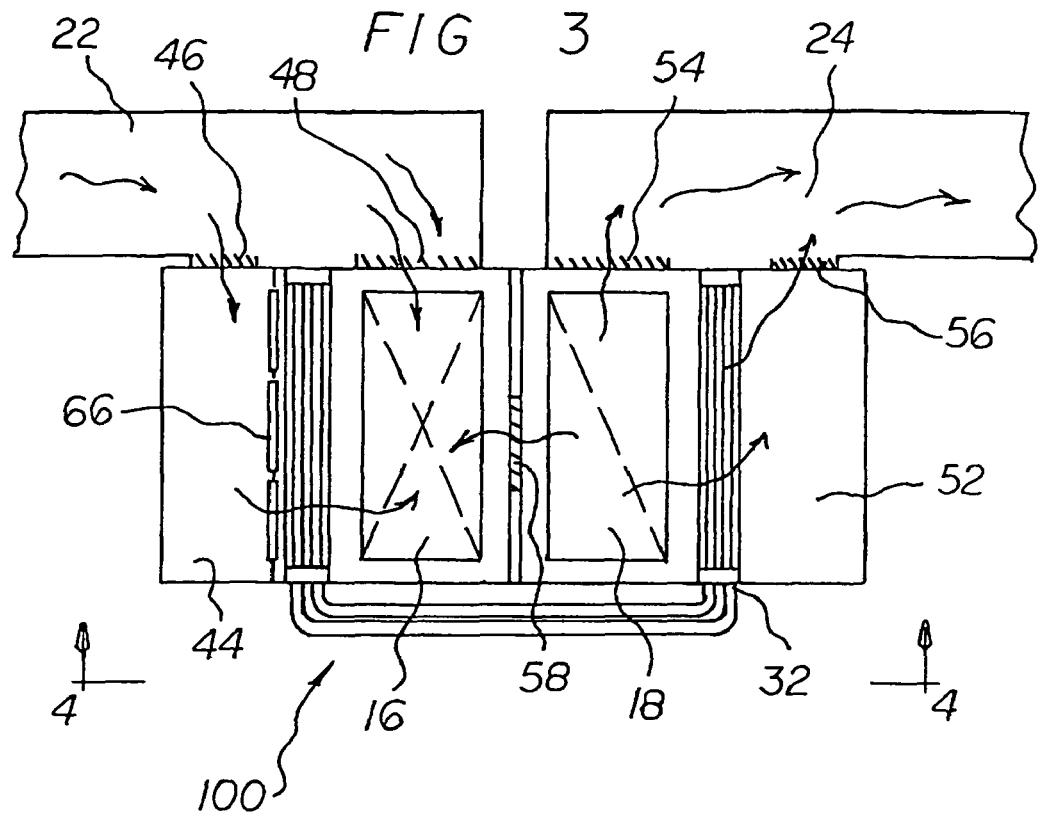
FIG. 3 is a plan view of a split heat recovery thermosyphon run around heat pipe system constructed in accordance with an alternative embodiment of the present invention.
Figure 4:
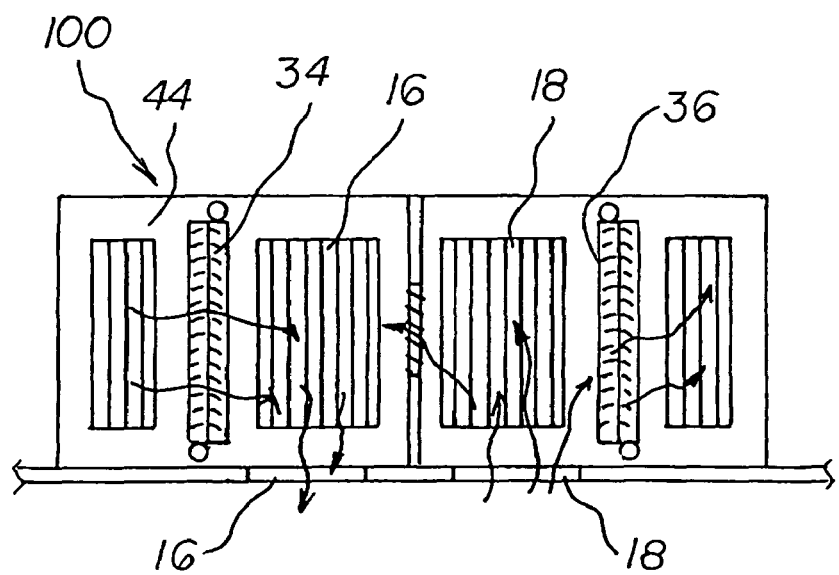
FIG. 4 is a side elevational view of the system take along line 4-4 of FIG. 3.

With reference now to the drawings, and in particular to FIG. 1 thereof, the preferred embodiment of the new and improved split heat recovery system embodying the principles and concepts of the present invention and generally designated by the reference numeral 10 will be described.

The present invention, the split heat recovery system 10 is comprised of a plurality of components. Such components in their broadest context include a space, a thermosyphon run around heat pipe assembly, a control device and an air filter. Such components are individually configured and correlated with respect to each other so as to attain the desired objective.

First provided is a room 14. The room has an inlet register 16. In this manner outside air is passed into the room. The room has an outlet register 18. In this manner exhaust air is passed from the room.

An air duct assembly includes an outside air duct 22. The outside air duct has an open first end. The first end is adapted to receive outside air. The outside air duct has a second end. The second end is located adjacent to the inlet register. The air duct assembly includes an exhaust air duct 24. The exhaust air duct has a first end. The first end is located adjacent to the inlet register. The exhaust air duct has an open second end. The second end is adapted to pass exhaust air to the atmosphere. The second end of the outside air duct is located adjacent to the first end of the exhaust air duct. The air duct assembly has an outside air passageway 26. The outside air passageway is provided through the outside air duct adjacent to the inlet register. The air duct assembly has an exhaust air passageway 28. The exhaust air passageway is provided through the exhaust air duct adjacent to the outlet register.

Provided next is a thermosyphon run around heat pipe assembly. The heat pipe assembly includes outside air coils 34. The heat pipe assembly includes exhaust air coils 36. The heat pipe assembly also includes vapor lines 38 and liquid lines 40. The vapor lines and liquid lines couple the outside air coils and the exhaust air coils. The assembly includes a fluid refrigerant. The refrigerant is provided in the air coils and the lines. The refrigerant is adapted to change state and move between the air coils and the lines. In this manner thermal energy is transferred during operation and use.

The outside air coils are positioned adjacent to and in advance of the inlet register. In this manner all of the outside air will pass through the outside air coils and then into the inlet duct. The exhaust air coils are positioned adjacent to and following the outlet register. In this manner all of the exhaust air will pass through the exhaust air coils and then into the outlet duct.

Further provided is a control device. The control device is provided in the form of a modulating return damper 58. The control device is provided between the inlet and outlet ducts.

Provided last is an air filter 68. The air filter is provided in the entrance chamber upstream of and adjacent to the outside air coils.

An alternate embodiment 100 of the present invention is provided.

A room 14 is provided. The room has an inlet register 16. In this manner outside air is passed into the room. The room has an outlet register 18. In this manner exhaust air is passed from the room.

An air duct assembly is provided. The air duct assembly includes an outside air duct 22. The outside air duct has an open first end. The first end is adapted to receive outside air. The outside air duct has a second end. The second end is located adjacent to the inlet register. The air duct assembly includes an exhaust air duct 24. The exhaust air duct has a first end. The first end is located adjacent to the inlet register. The exhaust air duct has an open second end. The second end is adapted to pass exhaust air to the atmosphere. The second end of the outside air duct is located adjacent to the first end of the exhaust air duct. The air duct assembly has an outside air passageway 26. The outside air passageway is provided through the outside air duct adjacent to the inlet register. The air duct assembly has an exhaust air passageway 28. The exhaust air passageway is provided through the exhaust air duct adjacent to the outlet register.

Provided next is a thermosyphon run around heat pipe assembly. The heat pipe assembly includes outside air coils 34. The heat pipe assembly includes exhaust air coils 36. The heat pipe assembly also includes vapor lines 38 and liquid lines 40. The vapor lines and liquid lines couple the outside air coils and the exhaust air coils. The assembly includes a fluid refrigerant. The refrigerant is provided in the air coils and the lines. The refrigerant is adapted to change state and move between the air coils and the lines. In this manner thermal energy is transferred during operation and use.

An entrance chamber 44 is provided. The entrance chamber is provided between the outside air passageway and the inlet register. The outside air coils are positioned within the entrance chamber at a central extent of the outside air passageway. In this manner a first portion of outside air will pass into the entrance chamber then through the outside air coils and then into the inlet duct. Further in this manner a second portion of outside air will pass into the entrance chamber bypassing the outside air coils and then into the inlet duct. A first damper 46 is provided. The first damper is provided in the entrance air passageway in advance of the outside air coils. A second damper 48 is provided. The second damper is provided in the entrance passageway following the outside air coils. The dampers are adapted to control the percent of outside air passing through the outside air coils.

An exit chamber 52 is provided. The exit chamber is provided between the outlet register and the exhaust air passageway. The outside air coils are positioned within the exit chamber at a central extent of the exhaust air passageway. In this manner a first portion of exhaust air will pass into the entrance chamber then through the exhaust air coils and then into the outlet duct. Further in this manner a second portion of exhaust air will pass into the exit chamber bypassing the exhaust air coils and then into the inlet duct. A first damper 54 is provided. The first damper is provided in the exhaust air passageway in advance of the exhaust air coils. A second damper 56 is provided. The second damper is provided in the exit passageway following the exhaust air coils. In this manner the percent of exhaust air passing through the exhaust air coils is controlled. A supplemental damper is provided. The supplemental damper is provided in the form of a modular return damper 58. The supplemental damper is provided between the inlet and outlet registers.

Further provided are control devices 62, 64. The control devices are provided in the vapor lines 38 and the liquid lines 40. The control devices in the vapor lines are small heat exchangers 62. In this manner the flow of vapor is controlled. The control devices in the vapor lines are valves 64. The valves control the flow of liquid.

Provided last is an air filter 68. The air filter is provided in the entrance chamber upstream of and adjacent to the outside air coils.

In general, the split system heat recovery includes a controller which is enabled whenever the supply air is operating. The control valves are normally open and may be controlled in sequence to provide the required amount of heat recovery. The controller monitors air temperatures and index stages of heat recovery as desired. All stages of heat recovery are off during use of the economizer cycle.

The sequence is a follows: When a heat recovery coil discharge air temperature is 75 degrees F. and above, all heat recovery control valves are opened allowing heat transfer to the exhaust air. When a heat recovery coil discharge temperature is between 52 degrees F. and 75 degrees F. all heat recovery control valves remain closed. Upon decreasing a heat recovery coil discharge air temperature, below 52 degrees F., all heat recovery control valves are stages open allowing heat recovery from exhaust air.

For frost control, the controller shall index stages of heat recovery to maintain an exhaust air discharge temperature above 35 degrees F. Upon a drop in discharge temperature below 40 degrees F. the first stage of heat recovery shall be disabled. If the discharge temperature continues to drop, additional stages of heat transfer shall be disabled to maintain a minimum 35 degrees F. exhaust air discharge temperature.

When required, a vapor line temperature control may be used to avoid premature condensation of vapor or to regulate the amount of vapor transfer.

As to the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by Letters Patent of the United States is as follows:

1. A split heat recovery thermosyphon run around heat pipe system for transferring heat within heating, ventilating and air conditioning systems without conventionally imposed location restrictions, the transferring being done in a safe, ecological, energy efficient and economical manner, the system comprising, in combination:

a room having an inlet register for passing outside air into the room, the room having an outlet register for passing exhaust air from the room, the inlet register and outlet register located adjacent to one another;

an air duct assembly including an outside air duct having an open first end adapted to receive outside air and a second end located adjacent to the inlet register, the air duct assembly including an exhaust air duct having a first end located adjacent to the outlet register and an open second end adapted to pass exhaust air to the atmosphere, the second end of the outside air duct being located adjacent to the first end of the exhaust air duct, an outside air passageway through the outside air duct adjacent to the inlet register, an exhaust air passageway through the exhaust air duct adjacent to the outlet register;

a thermosyphon run around heat pipe assembly including outside air coils, exhaust air coils with vapor lines and liquid lines coupling the outside air coils and the exhaust air coils, the assembly including a fluid refrigerant in the air coils and the lines, the refrigerant adapted to change state and move between the air coils and the lines for the transfer of thermal energy during operation and use;

a control device in the form of a modulating return damper between the inlet register and the outlet register;

the outside air coils being positioned adjacent to and in advance of the inlet register in a location such that all of the outside air will pass through the outside air coils and then into the outside air duct regardless of a position of the modulating return damper, the exhaust air coils being positioned adjacent to and following the outlet register in a location such that all of the exhaust air will pass through the exhaust air coils and then into the exhaust air duct regardless of a position of the modulating return damper; and an air filter in the entrance chamber upstream of and adjacent to the outside air coils.

* * * * *